(12) United States Patent
Abbing

(10) Patent No.: US 11,136,748 B2
(45) Date of Patent: Oct. 5, 2021

(54) DAMPENING VALVE UNIT

(71) Applicant: 3EFLOW AB, Luleå (SE)

(72) Inventor: Erik Abbing, Luleå (SE)

(73) Assignee: 3EFLOW AB, Lulea (SE)

(*) Notice: Subject to any disclaimer, the term of this patent is extended or adjusted under 35 U.S.C. 154(b) by 12 days.

(21) Appl. No.: 16/474,671

(22) PCT Filed: Dec. 27, 2017

(86) PCT No.: PCT/EP2017/084647
§ 371 (c)(1),
(2) Date: Jun. 28, 2019

(87) PCT Pub. No.: WO2018/122265
PCT Pub. Date: Jul. 5, 2018

(65) Prior Publication Data
US 2019/0316331 A1    Oct. 17, 2019

(30) Foreign Application Priority Data
Dec. 28, 2016   (SE) .................................. 1651745-0

(51) Int. Cl.
*E03B 7/07* (2006.01)
*F16K 17/04* (2006.01)
(Continued)

(52) U.S. Cl.
CPC .............. *E03B 7/078* (2013.01); *E03B 7/077* (2013.01); *E03B 7/08* (2013.01); *F16K 17/04* (2013.01);
(Continued)

(58) Field of Classification Search
CPC . E03B 7/078; E03B 7/077; E03B 7/08; E03B 7/07; F16K 17/04; F16K 47/00; F16L 55/052; F24D 19/1051
See application file for complete search history.

(56) References Cited

U.S. PATENT DOCUMENTS 3,019,818 A * 2/1962 Everett ................. F16L 55/053
138/30
3,343,560 A   9/1967 Nankivell et al.
(Continued)

FOREIGN PATENT DOCUMENTS

DE        4406150 A1   9/1995
WO     2012148351 A1  11/2012

*Primary Examiner* — Jessica Cahill
*Assistant Examiner* — Patrick C Williams

(57) ABSTRACT

A dampening valve unit, for use in a liquid distribution system is disclosed. A feeding conduit is evacuated of liquid after an associated tap unit is closed and refilled with liquid after the tap unit is opened. The dampening valve unit comprises a dampening chamber, connectable to said feeding conduit, and a liquid stop valve unit, connectable at an inlet end thereof, to said associated feeding conduit and which has an outlet end being connectable to said associated liquid tap unit. Said dampening chamber is adapted to collect gas and is connectable to said associated feeding conduit via a passage. The passage is directly connected, without any restrictions therebetween, also to a liquid stop valve at said inlet end. The passage is always open at the dampening chamber for fluid connection between the passage and the dampening chamber.

14 Claims, 10 Drawing Sheets

(51) Int. Cl.
*F16K 47/00* (2006.01)
*F16L 55/052* (2006.01)
*F24D 19/10* (2006.01)
*E03B 7/08* (2006.01)

(52) U.S. Cl.
CPC ............ *F16K 47/00* (2013.01); *F16L 55/052* (2013.01); *F24D 19/1051* (2013.01); *E03B 7/07* (2013.01)

(56) References Cited

U.S. PATENT DOCUMENTS

| | | | | |
|---|---|---|---|---|
| 4,635,683 | A * | 1/1987 | Nielsen | H01F 7/13 137/625.65 |
| 6,219,859 | B1 * | 4/2001 | Derakhshan | E03C 1/052 137/599.01 |
| 2013/0209298 | A1 | 8/2013 | Gaertner et al. | |
| 2013/0269813 | A1 | 10/2013 | Jang | |
| 2014/0202543 | A1 * | 7/2014 | Abbing | F24D 17/0031 137/1 |

\* cited by examiner

Fig.13
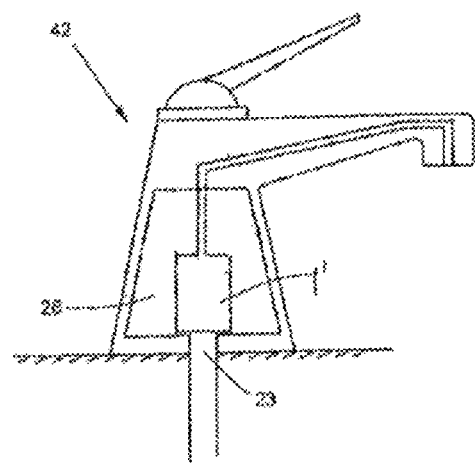
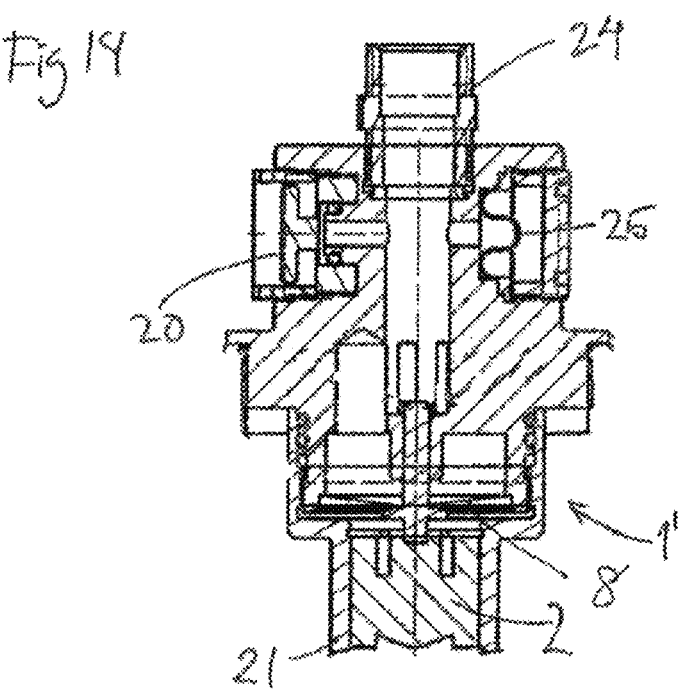
Fig 14

DAMPENING VALVE UNIT

CROSS REFERENCE TO RELATED APPLICATIONS

This is a National Phase entry of International Application No. PCT/EP2017/084647, filed Dec. 27, 2017, which claims priority to Sweden Patent Application No. 1651745-0, filed Dec. 28, 2016, the disclosures of which are incorporated herein by reference in their entireties.

FIELD OF TECHNOLOGY

The present invention concerns a dampening valve unit, for use in a liquid distribution system having a centrally located liquid source connected via at least one separate feeding conduit to at least one liquid tap unit. The at least one feeding conduit is evacuated of liquid when an associated tap unit is closed and refilled with liquid after the tap unit is opened. The dampening valve unit comprises a dampening chamber, which is connectable in use to at least one of said feeding conduit. It comprises also a liquid stop valve unit, which is connectable in use, at an inlet end thereof, to at least one of said associated feeding conduit and which has an outlet end being connectable in use to at least on of said associated liquid tap unit.

BACKGROUND ART

The present applicant has previously applied for a patent for the general system for example in WO2012148351. As is known per se from this patent application, the system operates in cycles, each comprising the following steps:
evacuating the liquid from the associated feeding conduit after completion of a tapping operation at the associated liquid tap unit, by generating a backward pressure gradient in the associated feeding conduit, so that the liquid flows backwards towards the liquid source and the associated feeding conduit thereafter contains only air or gas being retained therein, and
refilling, upon activating said liquid tap unit, the associated feeding conduit with liquid by generating a forward pressure gradient in the associated feeding conduit and permitting liquid to flow from the liquid source to the associated liquid tap unit, while pushing the remaining air or gas in the feeding conduit towards the associated liquid tap unit at an operating pressure exceeding an ambient air pressure level.

In the prior art system, as disclosed in the above-mentioned PCT application, each feeding conduit is connected to the liquid source by means of a single control valve, which can be open or closed. When it is open, the liquid source will feed liquid into the associated feeding conduit as long as the liquid tap unit signals that the flow of hot water should be maintained. When a tap unit is closed or deactivated, a signal is given so as to activate a centrally located pump which pumps back the liquid from the feeding conduit via the open control valve back to the liquid source. The same pump may be used for circulating hot water in the liquid source and for pumping back liquid from the feeding conduits. When a feeding conduit is completely evacuated, which is sensed by a level sensor, the control valve is closed again, so that the feeding conduit is retained at a relatively low pressure, slightly below the ambient air pressure, with only gas or air therein. Moreover, in the prior art system, air or gas will replace the liquid when it is evacuated from the feeding conduits. For this purpose, there is a special air valve adjacent to the liquid valve between the feeding conduit and the associated tap unit.

In order to have a smooth and practical function the applicant has improved parts of the previous system.

SUMMARY OF THE INVENTION

A problem with the known system is a pressure wave from when the water is refilling the conduits. Another problem is the risk of leaking water through the valve unit when letting out the air present in the conduits, after they have been emptied of water, during refilling the conduits with water.

Therefore, the applicant is applying for an improved system and method in a patent application, wherein the liquid distribution operates at a relatively low pressure, when the liquid is evacuated after a tapping operation, and at a relatively high, but typically still fairly normal, pressure during a tapping operation. During the entire operation of the liquid distribution system, each of the feeding conduits is kept in communication with an associated, closed dampening chamber, preferably via an associated passage, accommodating an inlet of a liquid stop valve unit which is connected to an associated liquid tap unit, in use. The conduits and dampening chamber forms a closed gas system. During the refilling step, the refilling liquid is brought to flow through the conduit into the associated passage. The liquid stop valve is kept closed until the refilling liquid has reached the inlet. Thereafter, the liquid stop valve is caused to open, for example by way of an increased pressure at said inlet, so as to let liquid flow via the liquid stop valve and into the associated liquid tap unit, but no gas or air may pass the liquid stop valve unit. The gas present in the closed system is pushed in front of the refilling liquid into the dampening chamber during refilling of the conduit. Thus, the risk of water leakage is delimited.

The present invention will concentrate on the dampening valve unit.

According to one aspect of the present invention a dampening valve unit comprises a dampening chamber, which is connectable in use to at least one of said feeding conduit. It comprises also a liquid stop valve unit, which is connectable in use, at an inlet end thereof, to at least one of said associated feeding conduit and which has an outlet end being connectable in use to at least on of said associated liquid tap unit. Said dampening chamber is adapted to collect gas and is connectable to said associated feeding conduit via a passage. The passage is directly connected, without any restrictions therebetween, also to a liquid stop valve at said inlet end of said liquid stop valve unit. Thus, no restriction by means of a small orifice liquid conduit or opening is present between the passage and the liquid stop valve. The passage is always open at the dampening chamber for fluid connection between the passage and the dampening chamber. The dampening valve unit and the feeding conduit in use form a closed system being separated from the ambient air. Thus, when the refilling liquid pushes the gas in front of the liquid both the gas and the liquid will be damped when the gas is compressed in the dampening chamber. Preferably the system has an under pressure in the conduits after the conduits are emptied. Thus, the amount of gas, such as air, is limited and may quickly be compressed inside the dampening chamber. This makes also the refilling of liquid very quick and a user opening a tap unit will almost immediately receive liquid. Preferably, the liquid stop valve unit opens at a threshold pressure of at least 1 bar over atmospheric pressure.

According to one embodiment the liquid stop valve unit comprises at least one non-return valve. This safe guards in a simple and effective way that neither liquid nor gas may leak into the conduit from the tap unit.

According to one embodiment a pressure responsive part, separate or integrated, is provided in the liquid stop valve unit which biases the at least one liquid stop valve in a closed state.

According to another embodiment the pressure responsive part, integrated or separate, has an opening characteristic going from the closed state to an open state with no or an incremental increase of pressure or a decrease of pressure after a threshold pressure has been reached. This type of opening characteristics provides a quick opening and as little flow limitation as possible.

According to a further embodiment the pressure responsive part is a spring. According to a still further embodiment the spring has a non-linear load-deflection characteristic curve with a horizontal or negative portion, thus providing a long deflection after a threshold pressure has been reached.

According to one embodiment a sensor for sensing pressure or another physical variable is provided downstream the at least one liquid stop valve in the liquid flow direction when the tap unit is open.

According to one embodiment a sensor for sensing pressure or another physical variable is provided in the liquid conduit and/or passage and/or dampening chamber and causes the liquid stop valve to open when: liquid has reached the passage; a threshold pressure has been reached; or the threshold pressure being a peak pressure has been passed and pressure is decreasing.

According to one embodiment a sensor is arranged in the tap unit sensing an opening of the tap unit and if so opening the fluid stop valve unit and closing the fluid stop valve unit when the tap unit is closed. The sensor could for example being a relay.

According to one embodiment the dampening chamber is arranged as a housing surrounding the liquid valve unit. This provides a compact unit which easily may be fitted inside a wall close to the tap unit or even within a tap unit.

According to one embodiment the damping chamber is arranged separately from the liquid valve unit.

According to one embodiment the dampening chamber has a free inner space.

According to one embodiment the dampening chamber is provided with an innermost, closed compartment having a pre-set pressure. This could be an advantage when dampening small volumes, i.e. short conduits.

According to one embodiment the compartment is divided by means of a membrane or a piston.

Further features and advantages will appear from the detail description below where different embodiments of the present invention are disclosed.

BRIEF DESCRIPTION OF THE DRAWINGS

The present invention will now be described in more detail under referral to appended drawings, in which:

FIG. 13 shows a tap unit comprising a dampening valve unit.

FIG. 14 shows a small additional dampening chamber arranged in the liquid valve unit.

DETAILED DESCRIPTION OF EMBODIMENTS OF THE INVENTION

Figure 1:
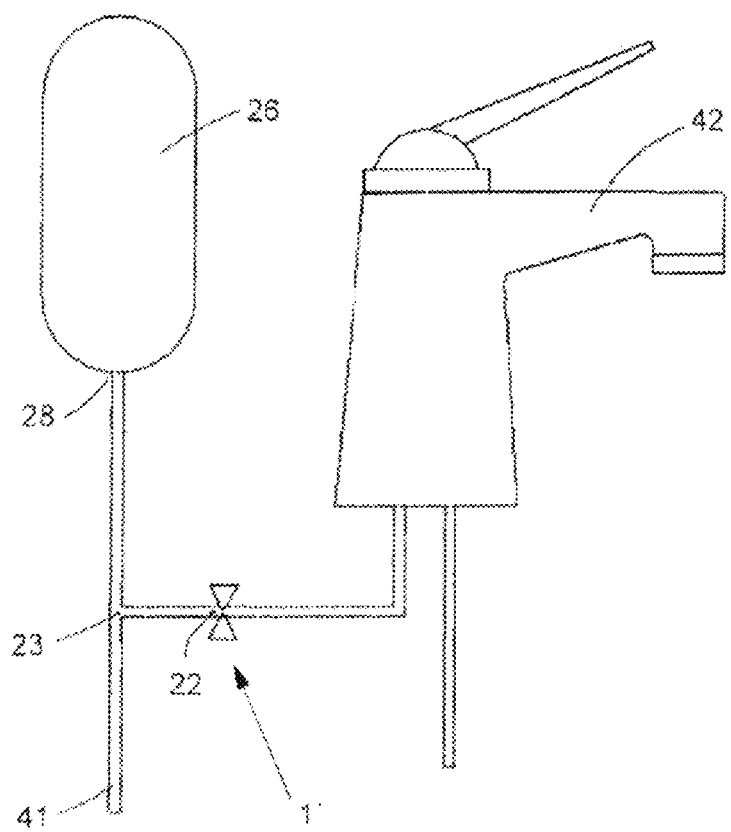
FIG. 1 shows an embodiment of a dampening valve unit.

In FIG. 1 a general embodiment of a dampening valve unit 40 of the invention is shown. The dampening valve unit 40 comprises a dampening chamber 26 and a liquid stop valve unit 1'. Both an inlet end 28 of the dampening chamber 26 and an inlet end 22 of the liquid stop valve unit 1' are connected to at least one conduit 41 in use, preferably via a passage 23. An outlet end 24 of the liquid stop valve unit 1' is connected to a liquid tap unit 42 in use. In FIG. 1 the dampening chamber 26 is provided separately but as will be shown below it is possible to house the liquid stop valve unit 1' inside the dampening chamber 26. Below different embodiments of different parts of the inventive dampening valve unit 40 will be described which may be combined in any possible way unless contradictory to the invention according to the claims.

Figure 2:
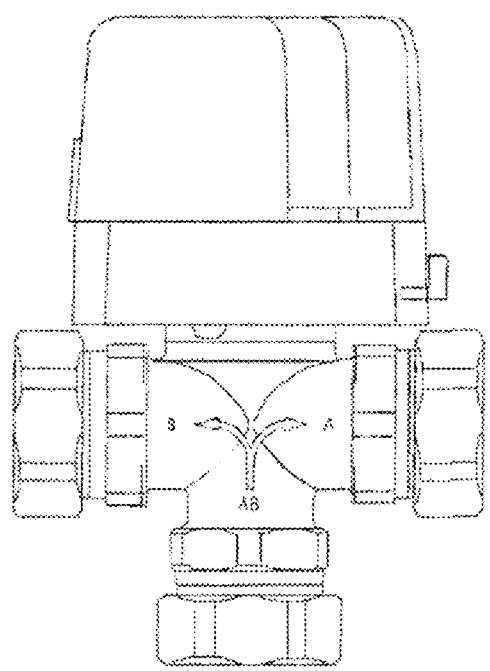
FIG. 2 shows an embodiment of a fluid stop valve unit having a solenoid valve or a motor valve.

The liquid stop valve unit 1' may comprise any type of liquid valve 2. For example it may be a solenoid valve or any type of motor driven valve or a valve driven by pneumatics or hydraulics, examples are shown in FIG. 2. According to an exemplified valve, at refilling gas is flowing through B into the dampening chamber 26 until liquid is sensed at the valve. Then the valve is switched over to let liquid flow through A to the tap unit 42. A sensor may be arranged in the system, for example in the liquid tap unit 42, in order to sense an opening or closing of the liquid tap unit 42. This may even be a relay arranged in the liquid tap unit 42. A sensor for sensing a physical variable, such as pressure, may be arranged in the dampening chamber 26, conduit 41 or downstream the liquid stop valve 2, seen in the flow direction when the liquid stop valve 2 is open. A signal from the sensor may be used to control the opening or closing of the liquid valve unit 1'.

According to another embodiment the liquid valve 2 comprises a pressure responsive part 3 and is kept in a closed state, by default, for example by being biased towards a closed state or by inherent forces kept closed, until a threshold pressure has been reached. This part 3 may be integrally or separately arranged in the liquid valve 2. Preferably, the liquid valve unit 1' comprises at least one non-return valve. To safe guard functionality at least two liquid valves 2 may be used, in case one of them fails. It is possible to use two liquid valves 2 connected in series.

In FIG. 2 a schematic view over a solenoid or a motor valve is shown. The fluid stop valve unit 1 may be controlled by sensing the pressure and acting upon that using a solenoid valve, a motor valve, pneumatics or hydraulics. According to an exemplified valve, at refilling, gas is flowing through B into the dampening chamber 26 until liquid is sensed at the valve. Then the valve is switched over to let liquid flow through A to the tap unit 42. It is also possible to let B stay open while A is open.

Figure 3:
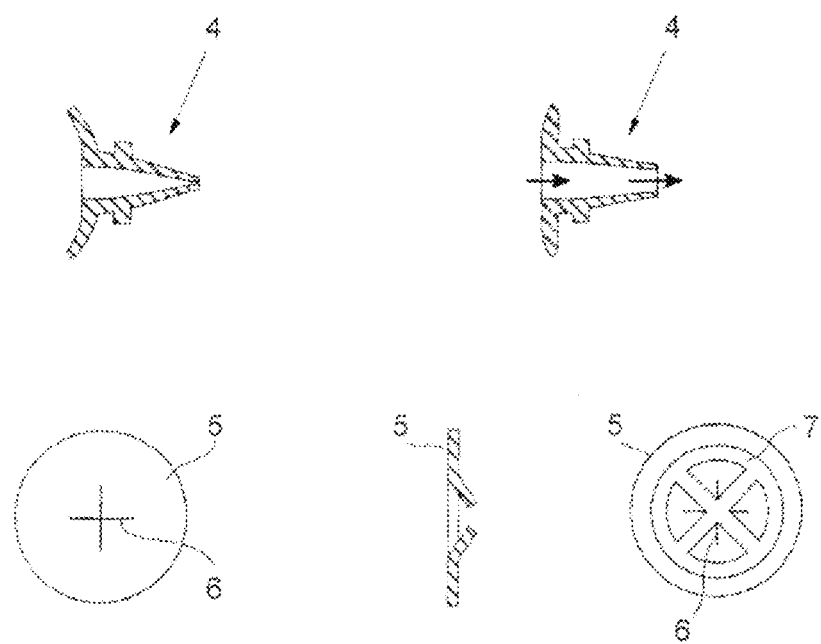
FIG. 3 shows a number of embodiments of a fluid stop valve unit wherein the pressure responsive part is a made of rubber or elastomer.

In FIG. 3 different examples of liquid stop valves 2 are shown which comprise a pressure responsive part 3 made of rubber or elastomer. For example, it could be a duck bill valve 4, where the pressure responsive part 3 is integrated as an inherent characteristic of the material, or a membrane 5 having at least one slit 6. If the membrane 5 valve is supported 7 on one side the membrane 5 it will only let fluid through in one direction.

Figure 4A:
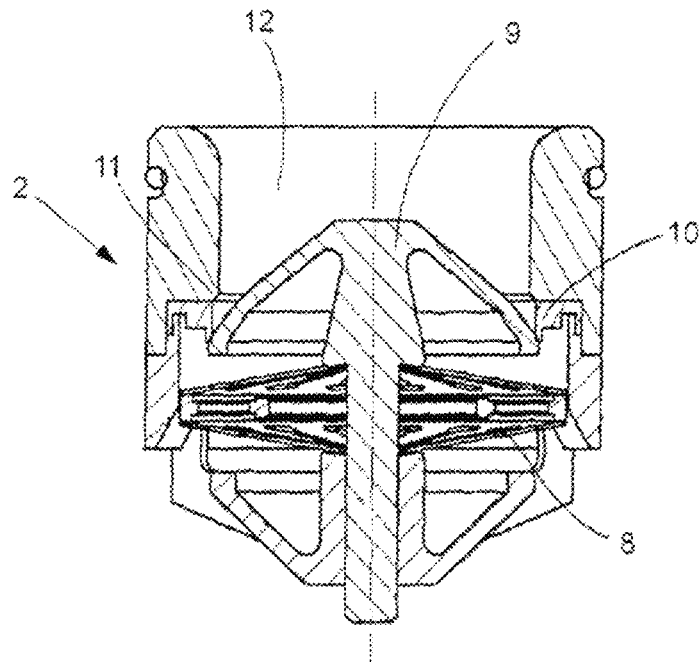
FIGS. 4a and b shows an embodiment where the pressure responsive part is an integrated spring.
Figure 4B:
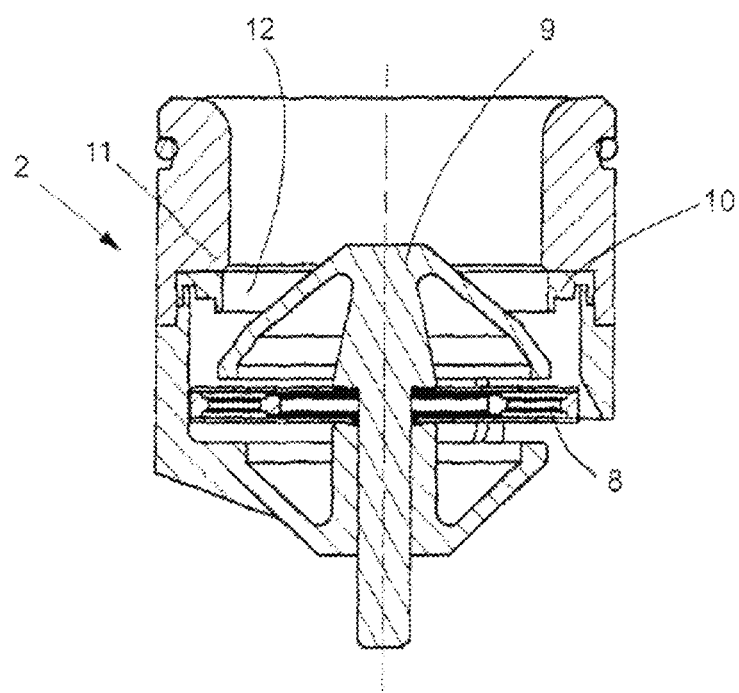

In FIGS. 4a and b an embodiment of the liquid stop valve 2 is shown where the pressure responsive part 3 is a spring 8, which is integrated in the valve 2. The liquid stop valve 2 is shown in two states, a closed state FIG. 4a and an open state FIG. 4b. In FIG. 4a a valve body 9 is in sealing contact with a seal 10 arranged in a valve seat 11 so that no liquid may flow through a liquid channel 12. A spring 8 bias the valve body 9 towards the seal 10 so that the valve is kept in a closed state until a pressure reaches a threshold level, i.e. over winning the biasing spring force and thus compress the spring 8, whereby the valve body 9 deflects towards an open state, as shown in FIG. 4b. In the shown embodiment two diaphragm springs of metal, arranged in a mirrored way, are used although it is possible to use only one spring or an elastomer type of spring, for example. It is also conceivable to have more than two diaphragm springs arranged in a stack.

Figure 5:
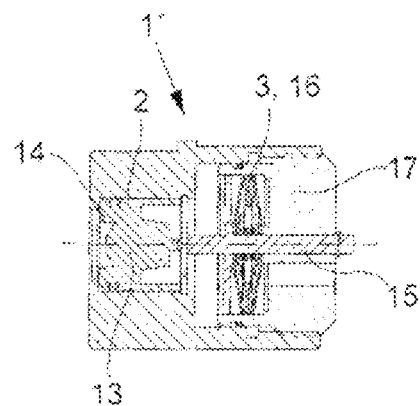
FIG. 5 shows an embodiment where the pressure responsive part is a separate spring.

In FIG. 5 an embodiment of a liquid stop valve unit 1' is shown having a separate pressure responsive part 3, in this case a separate spring 16. For example, this could be an elastomeric membrane spring or a metal diaphragm spring. Preferably the spring is of metal and has spring fingers, see FIG. 7. A liquid stop valve 2 is arranged in series with the spring 16. For example the liquid stop valve 2 may be a non-return valve having an internal coil spring (not shown) with a constant spring characteristic and a valve body 13 biased by this coil spring towards a valve seat 14. A central axle 15 is arranged from the valve body 13 in the flow direction of the fluid in the open state. At the axle 15 the spring 8 is fixedly attached and resting at a housing 17. The spring 16 may have a characteristic as described below, see FIG. 6. When a threshold pressure is reached the non-return valve 2 opens and the spring 16 will be compressed with a long deflection opening up the liquid stop valve unit 1', letting fluid flow through the liquid stop valve unit 1'.

In order to have a quick refilling of the conduits 41 in the liquid distribution system it is preferred to have a liquid stop valve unit 1' that opens as much as possible in immediately as a threshold pressure has been reached. The pressure responsive part 3 may have an opening characteristic as explained in FIG. 6. A graph is shown explaining the opening characteristics of an inventive fluid stop valve unit 1 comprising at least one fluid stop valve 2 and a pressure responsive part 3. The pressure responsive part 3 may be separately arranged in the fluid stop valve 2 or integrated. This opening characteristic can be accomplished if the load deflection characteristics curve is in accordance with the suggested curves in the graph such that the deflection is quickly increased, even up to fully open valve, without any increase or incremental increase of load or even a decrease of load after the threshold load has been reached. Curve A shows a characteristic only having an incremental increase of load in order to have a long deflection. Curve B shows a characteristic without any increase of load in order to have a long deflection. Curve C shows a characteristic with a decreasing load and despite this having a long deflection. Thus, the fluid stop valve will have a significantly higher flow rate at the same pressure drop or differential pressure across the valve, which will result in a higher flow rate than what would be possible with a common valve with the same required pressure to open.

Figure 6:
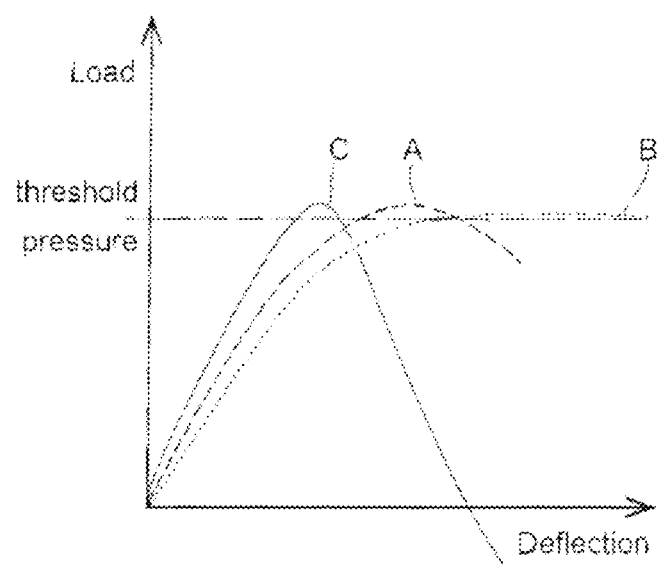
FIG. 6 shows a graph of load deflection characteristics for a fluid stop valve according to the invention.
Figure 7:
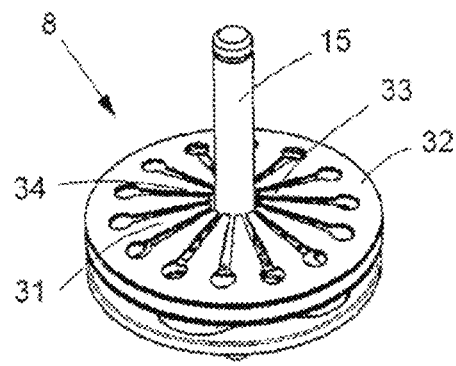
FIG. 7 shows an embodiment of a diaphragm spring having spring fingers.
Figure 7:
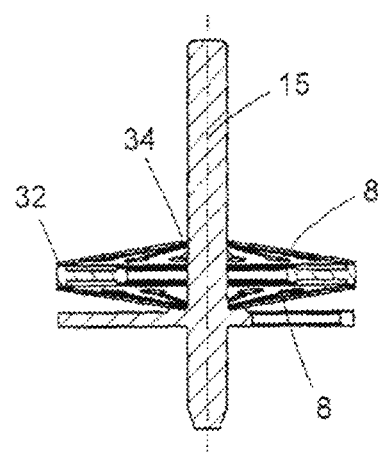

In FIG. 7 a spring 8 is shown having a diaphragm design with spring fingers 31 arranged along a rim 32 of the spring 8 and the fingers 31 pointing with their free ends 33 towards a centre 34. This spring 8 may have one or two resting states and a characteristic as shown in the graph of FIG. 6. The spring 8 has its fingers 31 pointing slightly outwards towards the centre 34 so that they show a design like a bowl, and thus have two sides facing opposite directions.

Figure 8A:
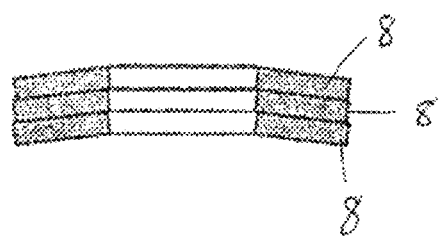
FIGS. 8a, b and c show different arrangements of springs having spring fingers.
Figure 8B:
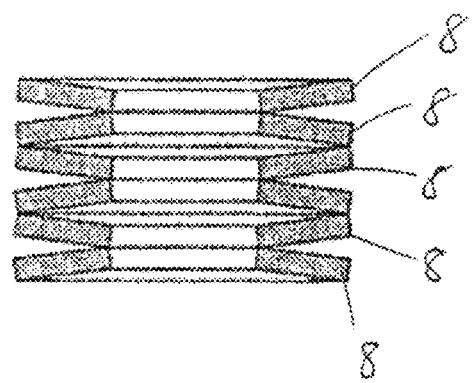
Figure 8C:
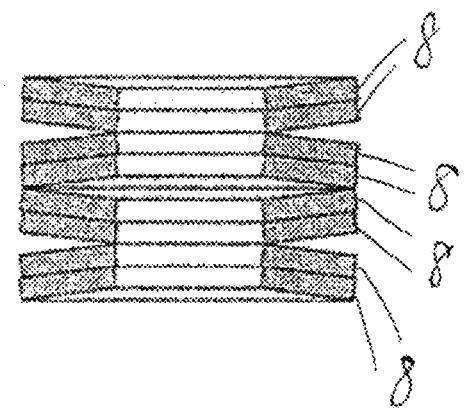

In FIG. 8a a preferred way of stacking springs 8 having spring fingers 31, in the shown case three springs 8 are stacked and the springs are oriented in the same direction. Thus, it is possible to use the fact that the springs 8 have two resting states, and may be forced over a flat position into a negative bulging position, since all the springs 8 are directed in the same way. In FIG. 8b several springs 8 having spring fingers 31 are stacked so that every second spring 8 is oriented in the opposite direction. These springs 8 may move to a flat position but not further, compared to the stacking of FIG. 8a. In FIG. 8c the springs 8 are stacked two and two and in opposite directions, respectively.

Figure 9:
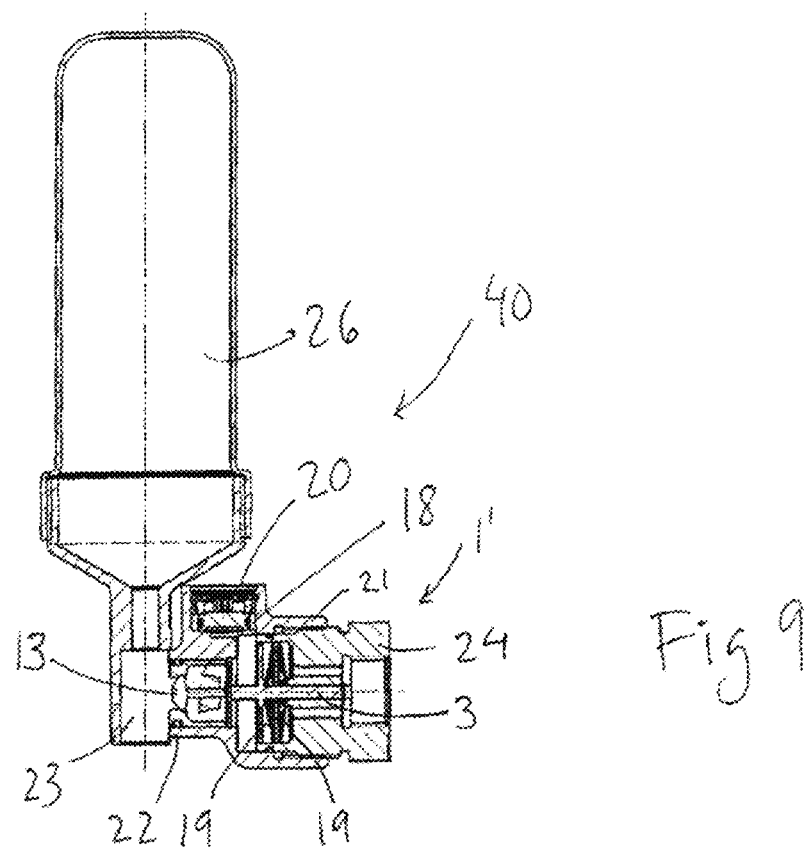
FIG. 9 shows an embodiment of a dampening valve unit with a liquid stop valve unit.

In FIG. 9 a dampening valve unit 40 is shown for use in a liquid distribution system having at least one feeding conduit 41 and at least one tap unit 42. There is a liquid stop valve unit 1' comprising one liquid stop valve 18, preferably a non-return valve, arranged in series with a separate pressure responsive part 3, in the shown case having two mirrored diaphragm springs 19. The design is similar to the embodiment of FIG. 5. An inlet side 22 of the liquid stop valve unit 1' is connected to a conduit 41, via a passage 23 comprised in the dampening valve unit 40, in use. The passage 23 is directly connected to also a valve body 13 of a liquid stop valve 18 the at liquid stop valve 18, i.e. without any restriction there between, such as a small orifice liquid conduit or opening, which is present in previous patent applications that were not yet published at filing of the priority application. Not having anything present between the passage 23 and the liquid stop valve 18 will enhance the flow of water to the tap unit 42. Perhaps a small volume of air might leak through the liquid stop valve 18 at the moment of opening but tests have shown that this amount is of insignificant impact. An outlet end 24 is connected to the tap unit 42, in use. A pressure sensor 20 is provided in a housing 21 for sensing the pressure downstream the valve 18 in the flow direction towards the tap unit.

When liquid is reaching the valve body 13 of the liquid stop valve 18 and the pressure of the liquid has reached a threshold level the at least one liquid stop valve 18 will open and due to the separate spring 19 the opening characteristics will be as shown in FIG. 6. A dampening chamber 26 is provided separately, although it is also conceivable to arrange the liquid stop valve unit inside the dampening chamber 26. The inlet to the dampening chamber is arranged at the passage 23 and the inlet is always open for fluid flow between the passage 23 and the dampening chamber 26, in both directions.

Figure 10:
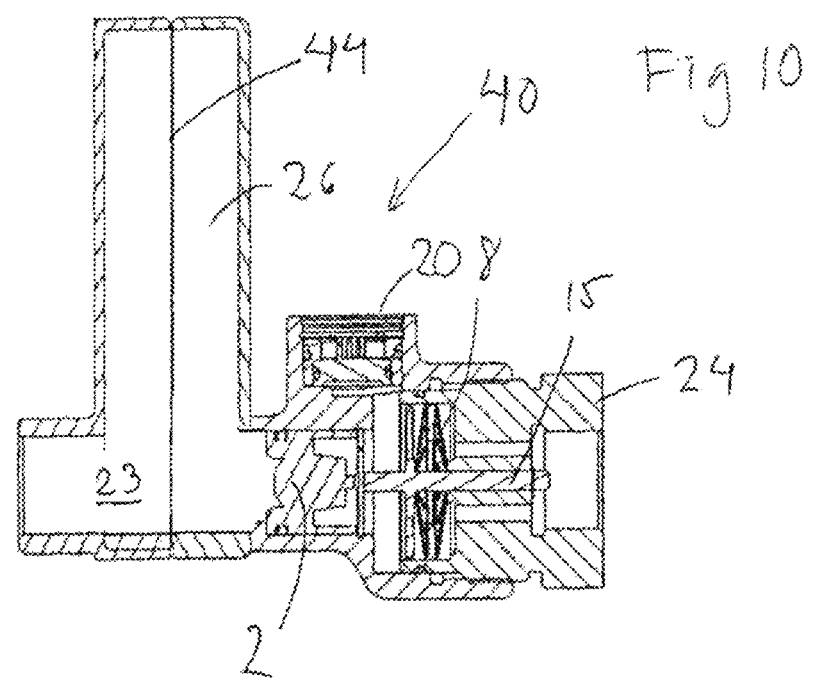
FIG. 10 shows an embodiment of a dampening chamber.

In FIG. 10 another embodiment of a dampening valve unit 40 is shown. A dampening chamber 26 is provided with liquid valve unit 1' having one liquid stop valve 2 directly connected to the passage 23. The shown dampening chamber 26 is welded along a welding joint 44. Here the liquid stop valve 2 is arranged directly connected and open to the passage 23 so that a valve body 13 of the liquid stop valve 2 meets the water coming from the feeding conduit 41 and through the passage 23 without any restrictions. The liquid stop valve 2 is located more or less after the inlet to the dampening chamber 26, seen in the flow direction when the tap unit 42 is open. It is also seen that the damping chamber 26 is open to the passage 23.

Figure 11:
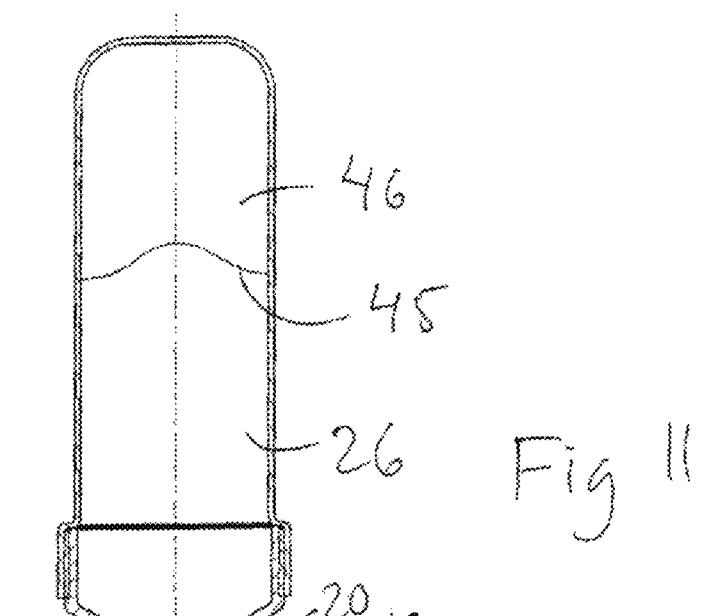
FIG. 11 shows another embodiment of a dampening chamber.
Figure 12:
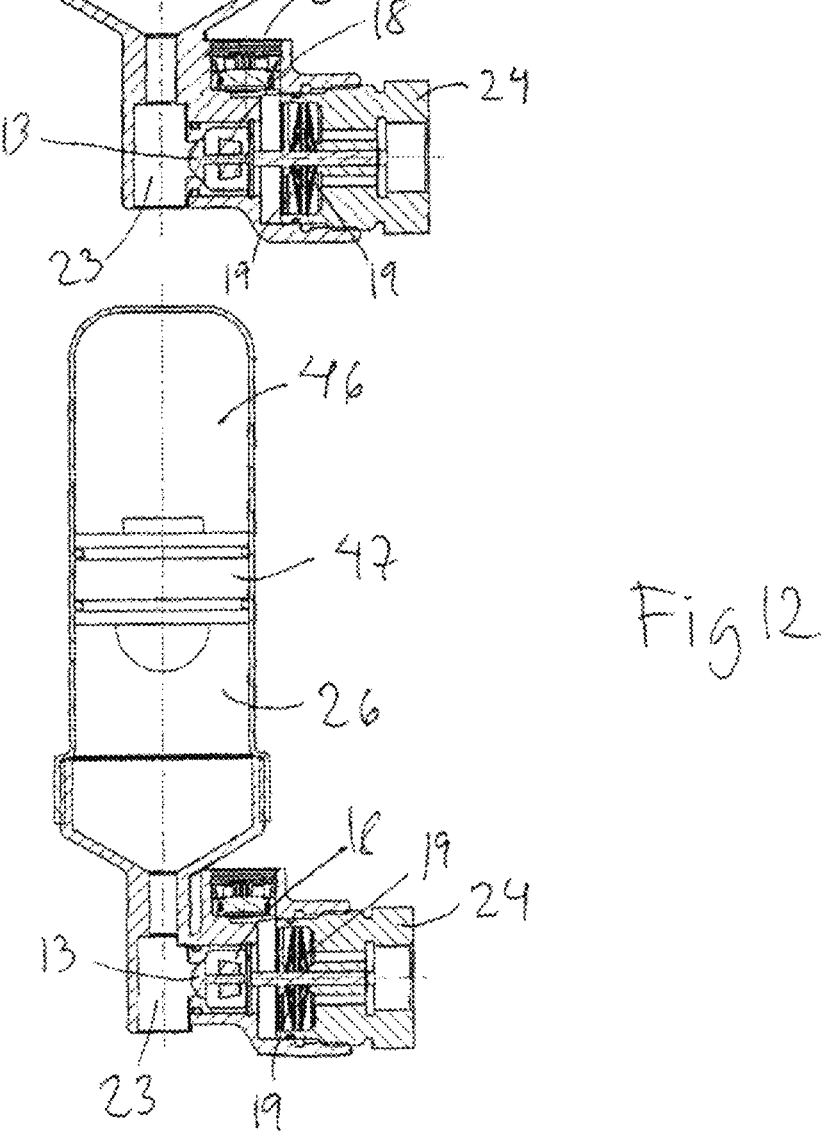
FIG. 12 shows a further embodiment of a dampening chamber.

In FIG. 11 an embodiment of a dampening chamber 26 is shown comprising an innermost, closed compartment 46 having a preset pressure. In the shown embodiment the closed compartment 46 is divided off by means of a membrane 45. This could also be accomplished with a movable wall 47, functioning as a piston, as shown in FIG. 12. In both these embodiments the passage connects directly to the liquid stop valve and is always open to the dampening chamber 26.

In FIG. 13 the dampening valve unit 40 is provided inside a tap unit 42 in a very compact embodiment. Also in this embodiment the liquid valve unit 1' is arranged inside the dampening chamber 26. Also here in this embodiment the passage connects directly to the liquid stop valve and is always open to the dampening chamber 26.

In FIG. 14 an embodiment of the liquid valve unit 1' is shown having a membrane 50 arranged after the liquid stop valve 2 but before the tap unit 42, seen in the flow direction when the tap unit 42 is open. This membrane 50 will serve as a small dampening chamber, taking care of any pressure built up after the liquid stop valve 2 if the tap unit 42 has been opened but closed again before the water has reached the tap unit 42. It may also be conceivable to use a piston or other pressure responsive or dampening device.

Finally, an idea of threshold pressures will be described. A liquid stop valve 1' could have a threshold pressure of at least 25-50% of the system pressure. The threshold pressure could for example be an overpressure of at least 1-2 bar over atmospheric pressure. An advantage of having a threshold pressure in this range is that the volume of the damping chamber may be kept smaller since the gas pressure therein may be higher without any risk of leaking gas out through the liquid stop valve 1'. The closing pressure could be as low as 0.1 bar or lower or until the flow has stopped. Due to this characteristic of the fluid stop valve the risk of hammering in the conduits will be minimized. Additionally, it will also minimize the risk of closing the fluid stop valve if a sudden pressure drop in the system would occur. The required threshold pressure across the valve to open it, is several times higher than the required pressure across the valve to hold it in an open position. Therefore, with a given system pressure available, the critical flow rate will be significantly higher due to low pressure drop across the valve compared with a common valve with a linear opening/closing characteristic.

A lot of different embodiments of different parts of a dampening valve unit has been described and the different embodiments of parts may be combined into a dampening valve unit in any possible way as long it is not contradictory to the invention according to the claims.

The invention claimed is:

1. A dampening valve unit for use in a liquid distribution system, the dampening valve unit comprising:
 a dampening chamber connectable to at least one feeding conduit of a centrally located liquid source connected via the at least one feeding conduit to at least one liquid tap unit, wherein the least one feeding conduit is evacuated of liquid after the at least one tap unit is closed and refilled with liquid after the at least one tap unit is opened; and
 a liquid stop valve unit having an inlet end and an outlet end, the inlet end connectable via the at least one feeding conduit, and the outlet end being connectable to the at least one liquid tap unit,
 wherein the dampening chamber is adapted to collect gas and is connectable to the at least one feeding conduit via a passage of the dampening valve unit, the passage being directly connected, without any restrictions therebetween, to the liquid stop valve unit at the inlet end of the liquid stop valve unit, and the passage is always open at the dampening chamber for fluid connection between the passage and the dampening chamber, and wherein the liquid stop valve unit comprises at least one non-return valve.

2. The dampening valve unit according to claim 1, wherein the liquid stop valve unit further comprises a pressure responsive part, which biases the at least one liquid stop valve in a closed state.

3. The dampening valve unit according to claim 2, wherein the pressure responsive part is configured to move to an open state after a threshold pressure has been reached, wherein, after moving to the open state, is configured to remain in the open state as long as a holding pressure is maintained, and wherein the holding pressure is lower than the threshold pressure.

4. The dampening valve unit according to claim 2, wherein the pressure responsive part is at least one spring.

5. The dampening valve unit according to claim 4, wherein the at least one spring has a non-linear load-deflection characteristic curve with a horizontal or negative portion, thus providing a long deflection after a threshold pressure has been reached.

6. The dampening valve unit, according to claim 4, wherein the at least one spring is a metal diaphragm spring.

7. The dampening valve unit according to claim 6, wherein the metal diaphragm spring has spring fingers arranged along a rim of the metal diaphragm springs the spring fingers having free ends, wherein the free ends point towards a center of the metal diaphragm spring.

8. The dampening valve unit according to claim 6, wherein the metal diaphragm spring has one or two resting states.

9. The dampening valve unit according to claim 4, wherein the at least one spring comprises at least two springs stacked in the same direction.

10. The dampening valve unit according to claim 4, wherein the at least one spring comprises at least three springs stacked in the same direction.

11. The dampening valve unit according to claim 1, wherein a sensor for sensing pressure or another physical variable is provided downstream the at least one liquid stop valve in a direction of liquid flow when the at least one liquid tap unit is open.

12. The dampening valve unit according to claim 1, wherein the dampening chamber has a free inner space.

13. The dampening valve unit according to claim 1, wherein a membrane, piston or other pressure responsive or dampening device, is provided within the liquid stop valve unit, between the at least one liquid stop valve and the outlet end, the membrane having the possibility to take care of pressure building up within the liquid stop valve unit.

14. The dampening valve unit according to claim 1, wherein the liquid stop valve unit opens at a threshold pressure of at least 1 bar over atmospheric pressure.

\* \* \* \* \*